(12) United States Patent  (10) Patent No.: US 10,818,108 B2
Wang et al.  (45) Date of Patent: Oct. 27, 2020

(54) METHODS AND SYSTEMS FOR VEHICLE MANAGEMENT

(71) Applicant: BEIJING DIDI INFINITY TECHNOLOGY AND DEVELOPMENT CO., LTD., Beijing (CN)

(72) Inventors: Yu Wang, Beijing (CN); Min Li, Beijing (CN); Rui Guo, Beijing (CN); Zhou Ye, Beijing (CN); Duokun Zhang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/749,968

(22) Filed: Jan. 22, 2020

(65) Prior Publication Data

US 2020/0160630 A1 May 21, 2020

Related U.S. Application Data

(63) Continuation of application No. PCT/CN2017/094062, filed on Jul. 24, 2017.

(51) Int. Cl.
*G07C 5/08* (2006.01)
*G06K 9/62* (2006.01)
(Continued)

(52) U.S. Cl.
CPC ......... *G07C 5/0816* (2013.01); *G06K 9/6277* (2013.01); *G06N 5/02* (2013.01);
(Continued)

(58) Field of Classification Search
None
See application file for complete search history.

(56) References Cited

U.S. PATENT DOCUMENTS 8,645,193 B2 * 2/2014 Swinson ............... G06Q 10/06
705/7.35
2010/0057479 A1 * 3/2010 De ....................... G06Q 10/00
705/305
(Continued)

FOREIGN PATENT DOCUMENTS

CN 106127650 A 11/2016
CN 106204138 A 12/2016
JP 2015141600 A 8/2015

OTHER PUBLICATIONS

International Search Report in PCT/CN2017/094062 dated Mar. 27, 2018, 5 pages.
(Continued)

*Primary Examiner* — Shelley Chen
(74) *Attorney, Agent, or Firm* — Metis IP LLC

(57) ABSTRACT

The present disclosure relates to systems and methods for vehicle management. The systems may perform the methods to obtain information associated with a vehicle in a first time period; determine an income value associated with the vehicle in a second time period based on the information associated with the vehicle; determine a cost value associated with the vehicle in the second time period based on the income value and the information associated with the vehicle; and generate a recommendation as to whether to discard the vehicle based on the income value and the cost value.

18 Claims, 5 Drawing Sheets

(51) Int. Cl.
*G06N 5/02* (2006.01)
*G06Q 10/06* (2012.01)
*G06Q 30/02* (2012.01)
*G07C 5/00* (2006.01)

(52) U.S. Cl.
CPC ..... *G06Q 10/0635* (2013.01); *G06Q 30/0206* (2013.01); *G07C 5/006* (2013.01); *G07C 5/008* (2013.01)

(56) References Cited

U.S. PATENT DOCUMENTS

| | | | |
|---|---|---|---|
| 2010/0211511 A1* | 8/2010 | Kawasaki | G06Q 10/067 705/306 |
| 2011/0202435 A1* | 8/2011 | Suh | G06Q 40/12 705/30 |
| 2014/0188329 A1* | 7/2014 | Chen | G07C 5/008 701/29.6 |
| 2014/0249959 A1* | 9/2014 | Ishida | G06Q 30/0623 705/26.61 |
| 2017/0236227 A1* | 8/2017 | Wagner | G06Q 40/12 705/2 |

OTHER PUBLICATIONS

Written Opinion in PCT/CN2017/094062 dated Mar. 27, 2018, 4 pages.
Wang Tao, Truck Cost Prediction Model and Its Application, Logistics Engineering and Management, 32 (190):37-39, 2010.
Extended European Search Report in European Application No. 17918961.8 dated Mar. 31, 2020, 8 pages.

\* cited by examiner

METHODS AND SYSTEMS FOR VEHICLE MANAGEMENT

CROSS-REFERENCE TO RELATED APPLICATIONS

This application is a continuation of International Application No. PCT/CN2017/094062 filed on Jul. 24, 2017, the contents of which are incorporated herein by reference to their entirety.

TECHNICAL FIELD

The present disclosure generally relates to a transportation service system, and more particularly, to methods and systems for vehicle management.

BACKGROUND

A user associated with a vehicle such as a driver of the vehicle, an owner of the vehicle or an operator of a vehicle management platform needs a recommendation as to whether to discard the vehicle when the vehicle runs for a period of time. However, there are some problems such as inefficiency and heavy reliance on human experience in existing methods and systems for generating a recommendation as to whether to discard a vehicle. Therefore, it is desirable to provide methods and systems for vehicle management to improve the efficiency for generating a recommendation as to whether to discard a vehicle.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to a first aspect of the present disclosure, an electronic system may include one or more storage media and one or more processors configured to communicate with the one or more storage media. The one or more storage media may include a set of instructions. When the one or more processors executing the set of instructions, the one or more processors may be directed to perform one or more of the following operations. The one or more processors may obtain information associated with a vehicle in a first time period. The one or more processors may determine an income value associated with the vehicle in a second time period based on the information associated with the vehicle. The one or more processors may determine a cost value associated with the vehicle in the second time period based on the income value and the information associated with the vehicle. The one or more processors may generate a recommendation as to whether to discard the vehicle based on the income value and the cost value.

In some embodiments, the one or more processors may receive a request from a user to evaluate the vehicle. The one or more processors may transmit the recommendation to the user in response to the request.

In some embodiments, to determine the cost value, the one or more processors may determine a vehicle mileage in the second time period based on the information associated with the vehicle. The one or more processors may determine an operation cost associated with the vehicle in the second time period based on the vehicle mileage in the second time period.

In some embodiments, to determine the cost value, the one or more processors may determine a current price of the vehicle in a first time point based on a first model and the information associated with the vehicle, the first time point being prior to the second time period. The one or more processors may determine one or more prices of the vehicle corresponding to one or more second time points in the second time period based on a second model different from the first model and the information associated with the vehicle. The one or more processors may determine a residual reduction value associated with the vehicle in the second time period based on the current price of the vehicle and one of the one or more prices of the vehicle in the second time period.

In some embodiments, the third time period may be prior to the second time period.

In some embodiments, the first model may be a gradient boosting decision tree regression model, and the second model may be an autoregressive integrated moving average model.

In some embodiments, to generate the recommendation as to whether to discard the vehicle based on the income value and the cost value, the one or more processors may determine whether the cost value is greater than the income value. The one or more processors may generate the recommendation to discard the vehicle in response to a determination that the cost value is greater than the income value.

In some embodiments, the first time period may be prior to the second time period.

In some embodiments, the information associated with the vehicle in the first time period may include at least one of a vehicle type, a vehicle age, a vehicle mileage, an operation cost of the vehicle, an operation income of the vehicle, or a price of the vehicle.

In some embodiments, the income value may include at least one of an operation income associated with the vehicle in the second time period, or a risk coefficient.

According to a second aspect of the present disclosure, a method may include one or more of the following operations. One or more processors may obtain information associated with a vehicle in a first time period. The one or more processors may determine an income value associated with the vehicle in a second time period based on the information associated with the vehicle. The one or more processors may determine a cost value associated with the vehicle in the second time period based on the income value and the information associated with the vehicle. The one or more processors may generate a recommendation as to whether to discard the vehicle based on the income value and the cost value.

According to a third aspect of the present disclosure, a non-transitory computer readable medium may comprise at least one set of instructions. The at least one set of instructions may be executed by one or more processors of a computer server. The one or more processors may obtain information associated with a vehicle in a first time period. The one or more processors may determine an income value associated with the vehicle in a second time period based on the information associated with the vehicle. The one or more processors may determine a cost value associated with the vehicle in the second time period based on the income value and the information associated with the vehicle. The one or more processors may generate a recommendation as to whether to discard the vehicle based on the income value and the cost value.

DETAILED DESCRIPTION

Figure 1:
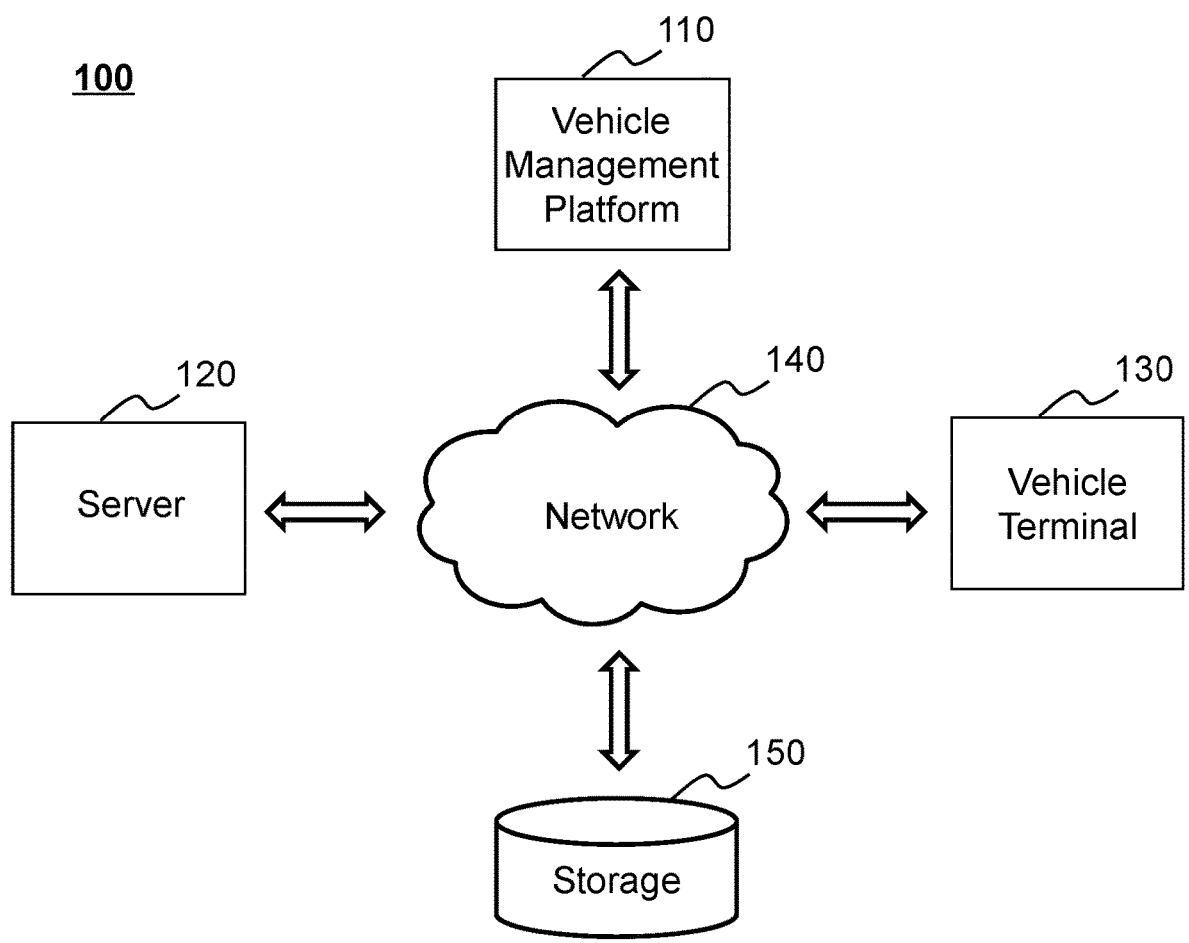
FIG. 1 is a schematic block diagram of an exemplary vehicle management system 100 according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts. An aspect of the present disclosure relates to online systems and methods for vehicle management. For example, a user associated with a vehicle such as a driver of the vehicle, an owner of the vehicle or an operator of a vehicle management platform may send a request to a server in the present disclosure to evaluate the vehicle. The server in the present disclosure may determine a plurality of future cost values that will be incurred by the vehicle and a plurality of income values that may be generated by the vehicle. The server in the present disclosure may compare the plurality of future cost values of the vehicle and the plurality of income values of the vehicle, respectively, and generate a recommendation as how to dispose (whether to discard, sell, or keep the vehicle) based on the comparison.

It should be noted that online vehicle management system is a new form of vehicle management system deeply rooted in post-Internet era. It provides technical solutions to users such as a manager of a plurality of vehicles raised only in post-Internet era. In pre-Internet era, a user may determine a recommendation as how to dispose a vehicle (e.g., whether to discard, sell, or keep the vehicle) substantially based on the experience of the user, which may cause inaccuracy of the recommendation. In addition, it is difficult to apply the mothed of evaluate a vehicle based on the experience of a user to the evaluation of a plurality of vehicles (e.g., a thousand vehicles) because of the inaccuracy and the inefficiency of the method. Online vehicle management system, however, obtains information associated with a plurality of vehicles from the vehicles via Internet and generate a recommendation as how to dispose the vehicles (e.g., whether to discard, sell, or keep the vehicles) automatically based on the information associated with the vehicles. Therefore, through Internet, the online vehicle management systems may provide a much more efficient and accurate vehicle management platform that may never met in a traditional pre-Internet vehicle management system for the users.

FIG. 1 is a schematic block diagram of an exemplary vehicle management system 100 according to some embodiments. The vehicle management system 100 may include a vehicle management platform 110, a server 120, a vehicle terminal 130, a network 140, and a storage 150.

The vehicle management platform 110 may be configured to manage a plurality of vehicles. The vehicle may include a taxi, a private car, a hitch, a bus, a bike, an electric bicycle, a tricycle, a motorcycle, a train, a bullet train, a high speed rail, a subway, a vessel, an aircraft, a spaceship, a hot-air balloon, a driverless vehicle, or the like, or any combination thereof. In some embodiments, the vehicle management platform 110 may monitor the plurality of vehicles in aspects of a vehicle age, a vehicle mileage, maintenance, income, fuel consumption, or the like, or any combination thereof. In some embodiments, the vehicle management platform 110 may dispatch the plurality of vehicles to provide a transportation service. The transportation service may include a taxi service, a delivery service, a bus service, a subway service, a railway service, a fire-fighting service, a first-aid service, an air service, a shipping service, or the like.

The server 120 may be configured to evaluate the plurality of vehicles managed by the vehicle management platform 110 and generate a recommendation as to whether to discard a vehicle. The server 120 may be a single server, or a server group. The server group may be centralized, or distributed (e.g., server 120 may be a distributed system). In some embodiments, the server 120 may be local or remote. For example, the server 120 may access information and/or data stored in the vehicle management platform 110, the vehicle terminal 130, and/or the storage 150 via the network 140. As another example, the server 120 may be directly connected to the vehicle management platform 110, the vehicle terminal 130, and/or the storage 150 to access stored information and/or data. In some embodiments, the server 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 120 may be implemented on a computing device 200 having one or more components illustrated in FIG. 2 in the present disclosure.

In some embodiments, the server 120 may process information and/or data relating to at least one vehicle to perform one or more functions described in the present disclosure. For example, the server 120 may generate a recommendation as to whether to discard a vehicle based on information associated with the vehicle obtained from the vehicle management platform 110 and/or the storage 150. In some embodiments, the server 120 may include one or more processing engines (e.g., single-core processing engine(s) or multi-core processor(s)). Merely by way of example, the server 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the vehicle management platform 110 and the server 120 may be implemented in one single device configured to perform the functions of the vehicle management platform 110 and the server 120 described in this disclosure.

The vehicle terminal 130 may refer to a device configured to send a request to evaluate a vehicle to the server 120 and receive a recommendation associated with the evaluation in response to the request from the server 120. In some embodiments, a user such as a driver of a vehicle or an owner of a vehicle may user the vehicle terminal 130 to send a request to the server 120 and receive a recommendation from the server 120.

In some embodiments, the vehicle terminal 130 may include a mobile device, a tablet computer, a laptop computer, a built-in device in a motor vehicle, or the like, or any combination thereof. In some embodiments, the mobile device may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, built-in device in the motor vehicle may include an onboard computer, an onboard television, etc. In some embodiments, the vehicle terminal 130 may be a device with positioning technology for locating the position of a vehicle and/or the vehicle terminal 130.

The network 140 may facilitate exchange of information and/or data. In some embodiments, one or more components in the vehicle management system 100 (e.g., the server 120, the vehicle management platform 110, the vehicle terminal 130, and the storage 150) may send information and/or data to other component(s) in the vehicle management system 100 via the network 140. For example, the server 120 may obtain/acquire a request to evaluate a vehicle from the vehicle management platform 110 via the network 140. In some embodiments, the network 140 may be any type of wired or wireless network, or combination thereof. Merely by way of example, the network 140 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 140 may include one or more network access points. For example, the network 140 may include wired or wireless network access points such as base stations and/or internet exchange points, through which one or more components of the vehicle management system 100 may be connected to the network 140 to exchange data and/or information.

The storage 150 may store data and/or instructions. In some embodiments, the storage 150 may store data obtained from the vehicle management platform 110 and/or the vehicle terminal 130. In some embodiments, the storage 150 may store data and/or instructions that the server 120 may execute or use to perform exemplary methods described in the present disclosure. In some embodiments, storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 140 to communicate with one or more components in the vehicle management system 100 (e.g., the server 120, the vehicle management platform 110, the vehicle terminal 130, etc.). One or more components in the vehicle management system 100 may access the data or instructions stored in the storage 150 via the network 140. In some embodiments, the storage 150 may be directly connected to or communicate with one or more components in the vehicle management system 100 (e.g., the server 120, the vehicle management platform 110, the vehicle terminal 130, etc.). In some embodiments, the storage 150 may be part of the server 120.

In some embodiments, one or more components in the vehicle management system 100 (e.g., the server 120, the vehicle management platform 110, the vehicle terminal 130, etc.) may have a permission to access the storage 150. In some embodiments, one or more components in the vehicle management system 100 may read and/or modify information relating to vehicles, requestors that send requests to evaluate a vehicle, and/or the public when one or more conditions are met. For example, the server 120 may read and/or modify information associated with a vehicle after generating a recommendation relating to evaluate the vehicle. As another example, the server 120 may access information relating to a requestor when receiving a request from the requester.

Figure 2:
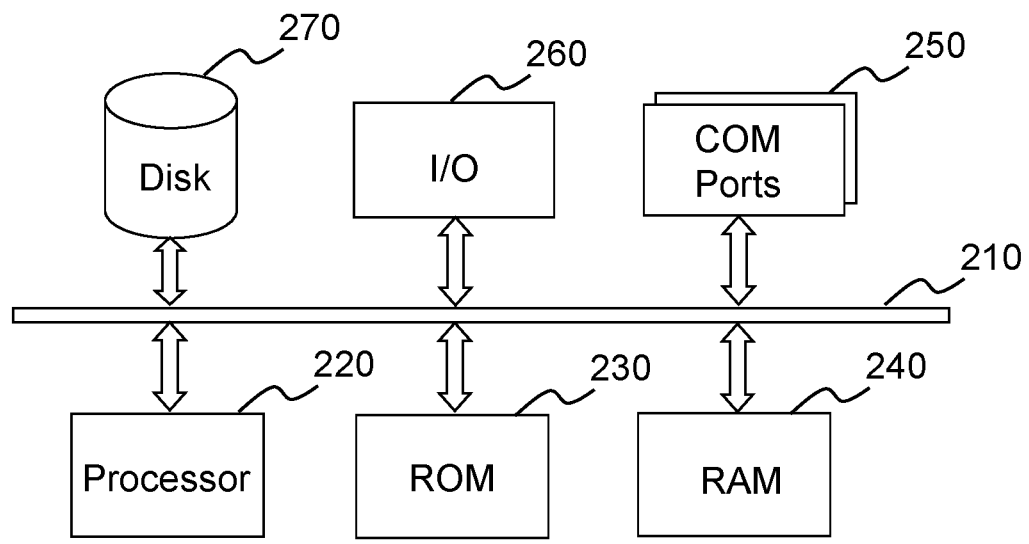
FIG. 2 is a schematic diagram illustrating exemplary hardware and software components of a computing device 200 according to some embodiments of the present disclosure.

FIG. 2 is a schematic diagram illustrating exemplary hardware and software components of a computing device 200 on which the server 120, the vehicle management platform 110, and/or the vehicle terminal 130 may be implemented according to some embodiments of the present disclosure. For example, the server 120 may be implemented on the computing device 200 and configured to perform functions of the server 120 disclosed in this disclosure.

The computing device 200 may be a general purpose computer or a special purpose computer, both may be used to implement a vehicle selling recommendation system for the present disclosure. The computing device 200 may be used to implement any component of the vehicle selling recommendation service as described herein. For example, the server 120 may be implemented on the computing device 200, via its hardware, software program, firmware, or a combination thereof. Although only one such computer is shown, for convenience, the computer functions relating to the vehicle selling recommendation service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O 260, supporting input/output between the computer and other components therein such as user interface elements. The computing device 200 may also receive programming and data via network communications.

Merely for illustration, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
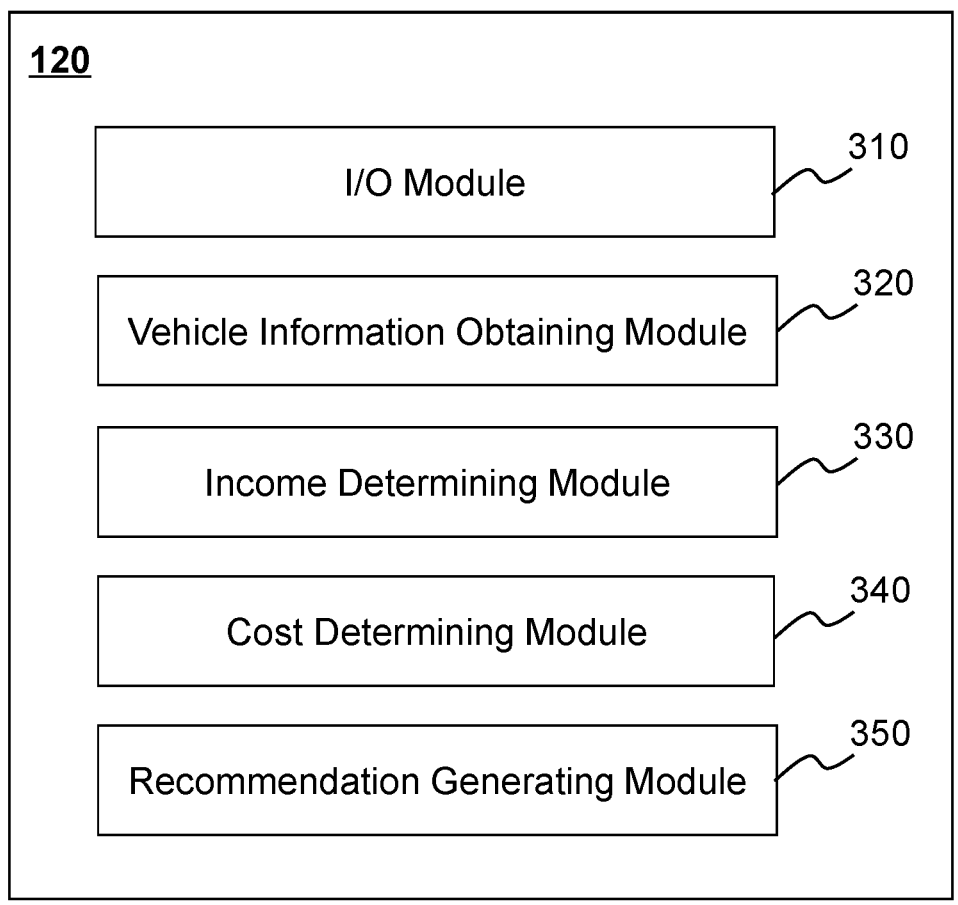
FIG. 3 is a schematic block diagram illustrating an exemplary architecture of a server according to some embodiments of the present disclosure.

FIG. 3 is a schematic block diagram illustrating an exemplary architecture of a server 120 according to some embodiments of the present disclosure. As illustrated, the server 120 may include an I/O module 310, a vehicle information obtaining module 320, an income determining module 330, a cost determining module 340, and a recommendation generating module 350. The modules may be hardware circuits of all or part of the server 120. The modules may also be implemented as an application or set of instructions read and executed by the server 120. Further, the modules may be a combination of the hardware circuits and the application/instructions. For example, the modules may be the part of the server 120 when the server 120 is executing the application/set of instructions.

The I/O module 310 may be configured to receive a request from a user to evaluate a vehicle. In some embodiments, the user may include at least one of a service provider associated with a vehicle (e.g., a taxi driver), a vehicle owner or an operator of the vehicle management platform 110. In some embodiments, the request may be associated with determining whether to discard a vehicle. In some embodiments, the service provider and/or the vehicle owner may send a request to evaluate a vehicle associated with the service provider and/or the vehicle owner to the server 120 using the vehicle terminal 130 via the network 140. For example, a service provider may send a request to evaluate a vehicle drove by the service provider to the server 120. As another example, an owner of a vehicle may send a request to evaluate a vehicle owned by the owner to the server 120. In some embodiments, the operator of the vehicle management platform 110 may send a request to evaluate one or more vehicles managed by the vehicle management platform 110 to the server 120 using the vehicle management platform 110 via the network 140.

In this disclosure, a time interval may be included in a time period. The time interval may be relatively short compared to the time period, such as one month or one week, and the time period including the time point may be relatively long compared to the time point, such as one year or half a year. For example, a time period of one year may include twelve time intervals each of which is one month. A current time interval and a current time point may be associated with the time when the I/O module 310 receives the request. For example, the I/O module 310 may receive the request on Apr. 10, 2017, the current time interval may be April, 2017, and the current time point may be the time when the I/O module 310 receives the request. A prior time point, a prior time interval and a prior time period including the prior time interval and the prior time point may be prior to the time when the I/O module 310 receives the request. A future time point, a future time interval and a future time period including the future time interval and the future time point may be behind the time when the I/O module 310 receives the request.

The vehicle information obtaining module 320 may be configured to obtain information associated with the vehicle. In some embodiments, the vehicle information obtaining module 320 may obtain the information associated with the vehicle corresponding to a prior time period. The prior time period may be prior to the time when the I/O module 310 receives the request. For example, the I/O module 310 may receive the request on Apr. 10, 2017, and the vehicle information obtaining module 320 may obtain the information associated with the vehicle in 2016. In some embodiments, the vehicle information obtaining module 320 may obtain the information associated with the vehicle corresponding to one or more prior time intervals in the prior time period. For example, the I/O module 310 may receive the request on Apr. 10, 2017, and the vehicle information obtaining module 320 may obtain the information associated with the vehicle corresponding to January, 2017 to March, 2017.

In some embodiments, the information associated with the vehicle may include a vehicle type (e.g., a vehicle of CAMRY™), a prior vehicle age, a prior vehicle mileage, a prior operation cost of the vehicle, a prior operation income of the vehicle, a prior price of the vehicle, or the like, or any combination thereof.

The vehicle age may refer to the number of years from the year of production of the vehicle to the year associated with a time interval. The prior vehicle age may be the vehicle age in a prior time interval that is within a prior time period. The prior vehicle age may refer to the number of years from the year of production of the vehicle to the year associated with the prior time interval. For example, the year of production of the vehicle may be 2012, the prior time interval may be March, 2017, and the vehicle age may be 5 years.

The vehicle mileage may refer to the distance that the vehicle travels from the date of production to a date associated with a time interval. The prior vehicle age may be the vehicle mileage in a prior time interval that is within a prior time period. The prior vehicle mileage may refer to the distance that the vehicle travels from the date of production to a date associated with the prior time interval. For example, the prior vehicle mileage may refer to the distance that the vehicle travels from the date of production to the last day of the prior time interval.

The operation cost of the vehicle may refer to the amount of money of maintaining the vehicle. The operation cost may include a repair cost, a cost of fuels, or the like, or any combination thereof. The prior operation cost may be the operation cost in a prior time interval that is within a prior time period.

The operation income of the vehicle may refer to the amount of money earned by providing transportation services using the vehicle. For example, for a taxi service, the operation income of the vehicle may refer to the amount of money that service requesters (e.g., passengers) pay for taxi services. The prior operation income may be the operation income in a prior time interval that is within a prior time period.

The price (e.g., residual value) of the vehicle may refer to the selling price of the vehicle in a time interval or at a time point. The selling price of the vehicle in a time interval may be represented by an average selling price of the vehicle in the time interval or a selling price of the vehicle at a time point within the time interval. The prior price of the vehicle may be the price of the vehicle in a prior time interval that is within a prior time period or at a prior time point that is within a prior time period.

In some embodiments, the vehicle management platform 110 may collect the information associated with vehicles managed by the vehicle management 110 and may store the information associated with vehicles in the storage 150. For example, the vehicle management platform 110 may obtain the vehicle mileage through the positioning technology installed in the vehicle terminal 130. As another example, a service provider (e.g., a taxi driver) may send the repair cost and/or the cost of fuels to the vehicle management platform 110. As a result, the server 120 may obtain the information associated with the vehicle from the vehicle management platform 110 and/or the storage 150.

The income determining module 330 may be configured to determine at least one future income value associated with the vehicle in a future time period based on the information associated with the vehicle. In some embodiments, the income value associated with the vehicle may refer to the amount of money that the vehicle may produce. In some embodiments, a future income value may be an income value in a future time interval that is within the future time period. The future time period and the future time interval may be behind the time when the I/O module 310 receives the request. For example, the I/O module 310 may receive the request on Apr. 10, 2017, and the income determining module 330 may determine 12 future income values corresponding to May, 2017 to April, 2018.

The future income value associated with the vehicle may include a future operation income and/or a risk coefficient. The future operation income may refer to the operation income generated by using and/or operating the vehicle corresponding to a future time interval in the future time period. The risk coefficient may be configured to reduce/or avoid an error in the future operation income. The income determining module 330 may determine the risk coefficient based on the price of a new vehicle of the same vehicle type associated with the time when the I/O module 310 receives the request. For example, the I/O module 310 may receive the request on Apr. 10, 2017, and the income determining module 330 may determine the risk coefficient based on the price of a new vehicle of the same vehicle type in April, 2017 or at a time point on Apr. 10, 2017. In some embodiments, the price of a new vehicle of the same vehicle type associated with the time when the I/O module 310 receives the request may be known by public. In some embodiments, the risk coefficient may be constant or adjustable for different situations. For example, the income determining module 330 may determine that the risk coefficient is 5% of the price of a new vehicle of the same vehicle type associated with the time when the I/O module 310 receives the request. As another example, for a high-end vehicle (e.g., Lamborghini™), the income determining module 330 may determine a relative large risk coefficient (e.g., 7% of the price of a new vehicle of the same vehicle type associated with the time when the I/O module 310 receives the request). For an ordinary vehicle (e.g., AIto™), the income determining module 330 may determine a relative small risk coefficient (e.g., 3% of the price of a new vehicle of the same vehicle type associated with the time when the I/O module 310 receives the request).

The cost determining module 340 may be configured to determine at least one future cost value associated with the vehicle in the future time period based on the information associated with the vehicle and the at least one future income value. The cost value associated with the vehicle may refer the amount of money that is cost on running the vehicle. In some embodiments, a future cost value may be a cost value in a future time interval that is within the future time period. In some embodiments, one future cost value may correspond to one future income value. For example, the I/O module 310 may receive the request on Apr. 10, 2017, and the income determining module 330 may determine 12 future income values corresponding to May, 2017 to April, 2018 and 12 future cost values corresponding to May, 2017 to April, 2018.

The future cost value may include a future operation cost of the vehicle and/or a future residual reduction value of the vehicle. The future cost value may refer to the cost value in a future time interval that is within the future time period. The residual reduction value (e.g., depreciation) may refer to the price reduction of the vehicle in a time interval (or at a time point) compared to the price of the vehicle in another time interval (or at another time point). The future residual reduction value may refer to the price reduction of the vehicle in a future time interval (or at a future time point) that is within the future time period compared to the price of the vehicle in a current time interval (or at a current time point) associated with the time when the I/O module 310 receives the request. For example, the I/O module 310 may receive the request on Apr. 10, 2017, the future residual reduction value in June may refer to the price reduction of the vehicle in June compared to the price of the vehicle in April, and the cost determining module 340 may determine the future residual reduction value in June based on the price of the vehicle in April and the price of the vehicle in June (e.g., as will be descried in detail in connection with FIG. 5). As another example, the I/O module 310 may receive the request on Apr. 10, 2017, the future residual reduction value in June may refer to the price reduction of the vehicle at a time point in June, 2017 compared to the price of the vehicle at a time point on Apr. 10, 2017, and the cost determining module 340 may determine the future residual reduction value in June based on the price of the vehicle at the time point on Apr. 10, 2017 and the price of the vehicle at the time point in June, 2017 (e.g., as will be descried in detail in connection with FIG. 5).

The recommendation generating module 350 may be configured to generate a recommendation as to whether to discard the vehicle based on the at least one future cost value and the at least one future income value.

The I/O module 310 may be further configured to transmit the recommendation to the user in response to the request. In some embodiments, the I/O module 310 may transmit the recommendation to the vehicle management platform 110 and/or the vehicle terminal 130.

The modules in the server 120 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the income determining module 330 may be integrated in the cost determining module 340 as a single module which may both determine the cost value and the income value. As another example, the I/O module 310 may be divided into two units. The first unit may be configured to receive a request from a user to evaluate a vehicle. The second unit may be configured to transmit a recommendation to the user.

It should be noted that the server 120 illustrated in FIG. 3 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the server 120 may further include a storage module configured to store data and/or instructions.

One of ordinary skill in the art would understand that when an element of the on-demand service system 100 performs, the element may perform through electrical signals (e.g., current) and/or electromagnetic signals. For example, when a vehicle terminal 130 sends out a request to the server 120, a processor of the vehicle terminal 130 may generate an electrical signal encoding the request. The processor of the vehicle terminal 130 may then send the electrical signal to an output port. If the vehicle terminal 130 communicates with the server 120 via a wired network, the output port may be physically connected to a cable, which further transmit the electrical signal to an input port of the server 120. If the vehicle terminal 130 communicates with the server 120 via a wireless network, the output port of the vehicle terminal 130 may be one or more antennas, which convert the electrical signal to electromagnetic signal. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
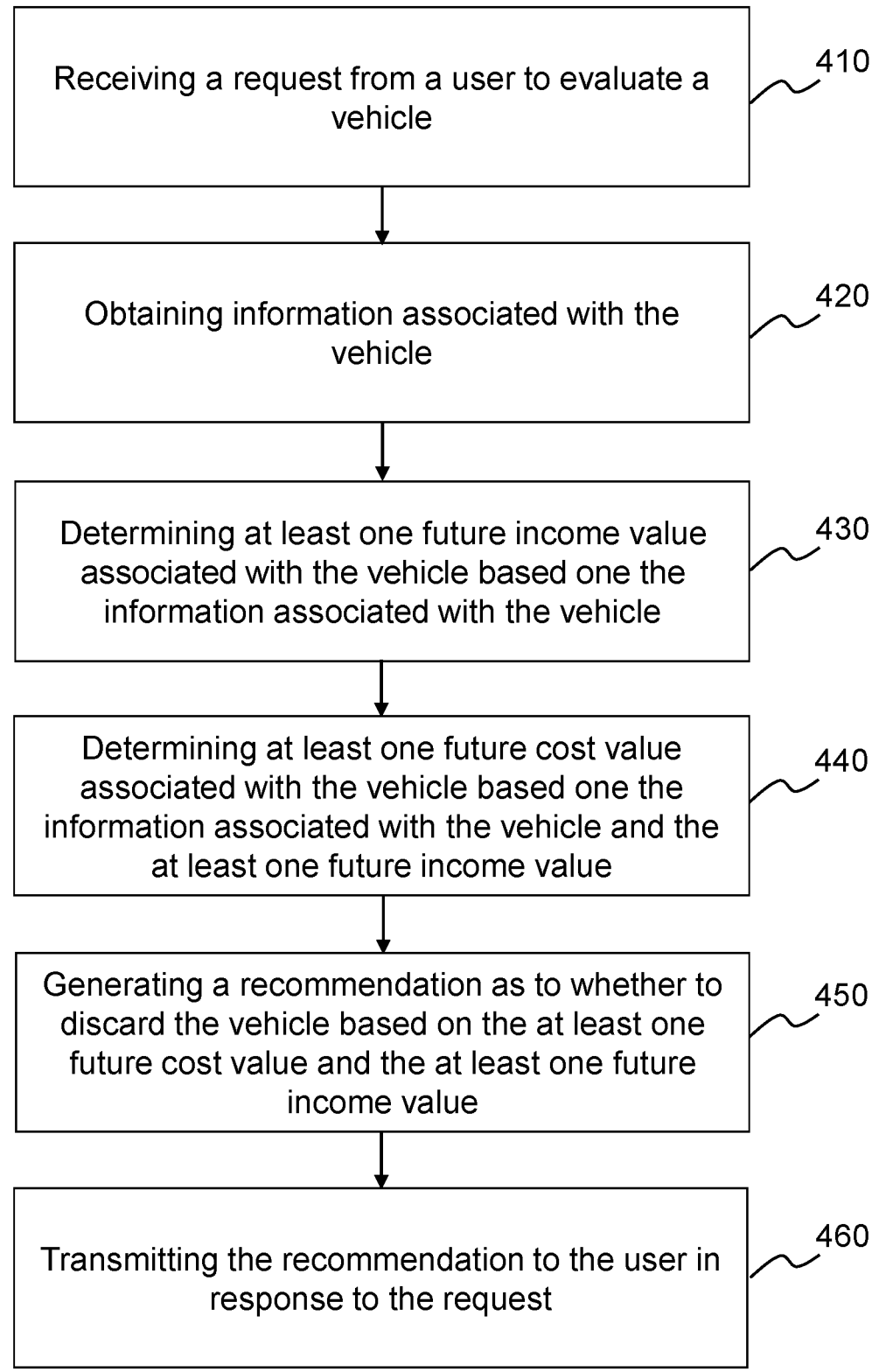
FIG. 4 is a flowchart illustrating an exemplary process of generating a recommendation according to some embodiments of the present disclosure.

FIG. 4 is a flowchart illustrating an exemplary process of evaluating a vehicle according to some embodiments of the present disclosure. In some embodiments, the process 400 may be implemented in the system 100 illustrated in FIG. 1. For example, the process 400 may be stored in the storage 150 and/or the storage device (e.g., the ROM 230, the RAM 240, etc.) as a form of instructions, and invoked and/or executed by the server 120 (e.g., the processor 220 of the server 120, or one or more modules in the server 120 illustrated in FIG. 3).

For brevity, the process 400 may take the evaluation of one vehicle as an example. It should be noted that the process 400 of evaluating a vehicle described below is merely an example or implementation. In some embodiments, the server 120 may evaluate at least one vehicle one by one or simultaneously based on the process 400.

In step 410, the I/O module 310 may receive a request from a user to evaluate a vehicle.

In some embodiments, the user may include at least one of a service provider (e.g., a taxi driver) associated with the vehicle, an owner of the vehicle or an operator of the vehicle management platform 110. In some embodiments, the request may include a recommendation inquiry as how to dispose the vehicle, such as an inquiry of whether one should keep the vehicle or discard the vehicle (such as selling the vehicle (and how much), or send the vehicle to junk yard). Disposing the vehicle may also include options such as dissemble the vehicle into parts and selling the parts, or renew/reconstruct all or part of the vehicle etc. Purely for illustration purpose without the intention to limit the scope and spirit of the disclosure, the below disclosure will take the request of whether to discard the vehicle as an example. In some embodiments, the service provider and/or the vehicle owner may send a request to evaluate a vehicle associated with the service provider and/or the vehicle owner to the server 120 using the vehicle terminal 130 via the network 140. For example, a service provider may send a request to evaluate a vehicle drove by the service provider to the server 120. As another example, an owner of a vehicle may send a request to evaluate a vehicle owned by the owner to the server 120. In some embodiments, the operator of the vehicle management platform 110 may send a request to evaluate one or more vehicles managed by the vehicle management platform 110 to the server 120 using the vehicle management platform 110 via the network 140.

In step 420, the vehicle information obtaining module 320 may obtain information associated with the vehicle.

In some embodiments, the vehicle information obtaining module 320 may obtain the information associated with the vehicle corresponding to a prior time period. The prior time period may be prior to the time when the I/O module 310 receives the request. For example, the I/O module 310 may receive the request on Apr. 10, 2017, and the vehicle information obtaining module 320 may obtain the information associated with the vehicle in 2016. In some embodiments, the vehicle information obtaining module 320 may obtain the information associated with the vehicle corresponding to one or more prior time intervals in the prior time period. For example, the I/O module 310 may receive the request on Apr. 10, 2017, and the vehicle information obtaining module 320 may obtain the information associated with the vehicle corresponding to January, 2017 to March, 2017. In some embodiments, the information associated with the vehicle may include a vehicle type (e.g., a vehicle of CAMRY™), a prior vehicle age, a prior vehicle mileage, a prior operation cost of the vehicle, a prior operation income of the vehicle, a prior price of the vehicle, or the like, or any combination thereof.

In step 430, the income determining module 330 may determine and/or predict at least one future income value associated with the vehicle based on the information associated with the vehicle. The future income value associated with the vehicle may include a future operation income and/or a risk coefficient. The future operation income may refer to the operation income generated by using and/or operating the vehicle corresponding to a future time interval that is within the future time period.

In some embodiments, the income determining module 330 may determine at least one future operation income based on at least one prior operation income. For example, the income determining module 330 may determine and/or predict 12 future operation income corresponding to May, 2017 to April, 2018 based on 24 prior operation income corresponding to January, 2015 to December, 2016. In some embodiments, the income determining module 330 may determine a first rule (e.g., a function, a data table or a model) to describe the operation income in different time intervals based on the at least one prior operation income and determine the at least one future operation income based on the first rule. In some embodiments, the income determining module 330 may determine the first rule based on an Autoregressive Integrated Moving Average (ARIMA) model. In some embodiments, the income determining module 330 may determine the first rule by training the ARIMA model using the vehicle type, at least one prior vehicle age or the at least one prior operation income of the vehicle.

In some embodiments, the income determining module 330 may determine the at least one future operation income one by one or simultaneously.

For brevity, the description of determining the at least one future income value may take the determination of one future income value as an example. It should be noted that the description of determining the future income value described below is merely an example or implementation. In some embodiments, the income determining module 330 may determine the at least one future income value one by one or simultaneously based on the description of determining the future income value described below.

In some embodiments, the future income value may be a linear combination of the future operation income and the risk coefficient. In some embodiments, the income determining module 330 may determine the future income value based on Equation (1) below:

$$V_{income} = x_1 C_I + x_2 C_P, \qquad \text{Equation (1)}$$

wherein $V_{income}$ may refer to the future income value, $C_I$ may refer to the future operation income, $C_P$ may refer to the risk coefficient, $x_1$ may refer to a coefficient of the future operation income, $x_2$ may refer to a coefficient of the risk coefficient, $x_1$ may be larger than 0, and $x_2$ may be larger than or equal to 0.

In some embodiments, the income determining module 330 may determine a future income value in a future time interval that is within the future time period based on a future operation income in the same future time interval. For example, the income determining module 330 may determine a future income value in May, 2017 based on a future operation income in May, 2017.

In step 440, the cost determining module 340 may determine at least one future cost value associated with the vehicle based on the information associated with the vehicle and the at least one future income value. The future income value associated with the vehicle may include a future operation cost and/or a future residual reduction value. The future operation cost may include a future repair cost, a future cost of fuels, or the like, or any combination thereof. The future repair cost may refer the repair cost in a future time interval that is within the future time period. The future cost of fuels may refer to the cost of fuels in a future time interval that is within the future time period. In some embodiments, the rate of reducing of the price of the vehicle may decrease over time. However, the repair cost of the vehicle may increase over time. The future cost value may increase over time because of the effect of the future repair cost. The future cost value may be greater than the future income value in a future time interval under the effect of the future cost value.

In some embodiments, the cost determining module 340 may determine at least one future operation cost based on at least one prior operation cost. For example, the cost determining module 340 may determine 12 future operation cost corresponding to May, 2017 to April, 2018 based on 24 prior operation cost corresponding to January, 2015 to December, 2016.

In some embodiments, the cost determining module 340 may determine a second rule (e.g., a function, a data table or a model) to describe the operation cost in different time intervals based on the at least one prior operation cost and determine the at least one future operation income based on the second rule. In some embodiments, the cost determining module 340 may determine the second rule based on an Autoregressive Integrated Moving Average (ARIMA) model. In some embodiments, the cost determining module 340 may determine the second rule by training the ARIMA model using the vehicle type, at least one prior vehicle age or the at least one prior operation cost of the vehicle.

In some embodiments, the longer distance the vehicle travels, the more the operation cost may be. The cost determining module 340 may determine the at least one future operation cost based on at least one prior vehicle mileage. In some embodiments, the cost determining module 340 may determine a third rule (e.g., a function, a data table or a model) to describe the vehicle mileage in different time intervals based on the at least one prior vehicle mileage and determine a future vehicle mileage based on the third rule. In some embodiments, the cost determining module 340 may determine the third rule based on an Autoregressive Integrated Moving Average (ARIMA) model. In some embodiments, the cost determining module 340 may determine the third rule by training the ARIMA model using the vehicle type, at least one prior vehicle age or the at least one prior vehicle mileage. In some embodiments, the cost determining module 340 may obtain a fourth rule (e.g., a function, a data table or a model) to describe the operation cost corresponding to different vehicle mileages based on at least one prior operation cost and at least one prior vehicle mileage. In some embodiments, the cost determining module 340 may determine the future operation cost based on the fourth rule and the future vehicle mileage. In some embodiments, the cost determining module 340 may determine the at least one future operation cost one by one or simultaneously.

The residual reduction value may refer to the price reduction of the vehicle in a time interval (or at a time point) compared to the price of the vehicle in another time interval (or at another time point). The future residual reduction value may refer to the price reduction of the vehicle in a future time interval (or at a future time point) that is within the future time period compared to the price of the vehicle in the current time interval (or at a current time point) associated with the time when the I/O module 310 receives the request. For example, the I/O module 310 may receive the request on Apr. 10, 2017, the future residual reduction value in June may refer to the price reduction of the vehicle in June compared to the price of the vehicle in April, and the cost determining module 340 may determine the future residual reduction value in June based on the price of the vehicle in April and the price of the vehicle in June (e.g., as will be descried in detail in connection with FIG. 5). As another example, the I/O module 310 may receive the request on Apr. 10, 2017, the future residual reduction value in June may refer to the price reduction of the vehicle at a time point in June, 2017 compared to the price of the vehicle at a time point on Apr. 10, 2017, and the cost determining module 340 may determine the future residual reduction value in June based on the price of the vehicle at the time point on Apr. 10, 2017 and the price of the vehicle at the time point in June, 2017 (e.g., as will be descried in detail in connection with FIG. 5).

For brevity, the description of determining the at least one future cost value may take the determination of one future cost value as an example. It should be noted that the description of determining the future cost value described below is merely an example or implementation. In some embodiments, the cost determining module 340 may determine the at least one future cost value one by one or simultaneously based on the description of determining the future cost value described below.

In some embodiments, the future cost value may be a linear combination of the future operation cost and the future residual reduction value. In some embodiments, the cost determining module 340 may determine the future cost value based on Equation (2) below:

$$V_{cost} = x_3 C_c + x_4 C_R,\qquad\text{Equation (2)}$$

wherein $V_{cost}$ may refer to the future cost value, $C_c$ may refer to the future operation cost, $C_R$ may refer to the future residual reduction value, $x_3$ may refer to a coefficient of the future operation cost, $x_4$ may refer to a coefficient of the future residual reduction value, and $x_3$ and $x_4$ may be larger than 0.

In some embodiments, the cost determining module 340 may determine a future cost value in a future time interval that is within the future time period based on a future operation cost in the same future time interval and a future residual reduction value in the same future time interval. For example, the cost determining module 340 may determine a future cost value in May, 2017 based on a future operation cost in May, 2017 and a future residual reduction value in May, 2017.

In step 450, the recommendation generating module 350 may generate a recommendation as to whether to discard the vehicle based on the at least one future cost value and the at least one future income value.

In some embodiments, the recommendation generating module 350 may compare the at least one future cost value and the at least one future income value, respectively. The recommendation generating module 350 may generate a recommendation based on the at least one comparison. In some embodiments, among the at least one comparison, if there is no comparison indicating that the future cost value is greater than the future income value, the recommendation generating module 350 may generate a recommendation to keep running the vehicle. If there is at least one comparison indicating that the future cost value is greater than the future income value, the recommendation generating module 350 may generate a recommendation to discard the vehicle (such as selling the vehicle or send the vehicle to junk yard). Further, the recommendation generating module 350 may generate a recommendation to discard the vehicle from a turning point. The turning point may refer to the first future time interval of which the comparison indicates that the future cost value is greater than the future income value. For example, the I/O module 310 may receive a request from a user to evaluate a vehicle on Apr. 10, 2017, the income determining module 330 may determine 12 future income value of the vehicle corresponding to May, 2017 to April, 2018, and the cost determining module 340 may determine 12 future cost value of the vehicle corresponding to May, 2017 to April, 2018. The recommendation generating module 350 may compare the 12 future income value and the 12 future cost value, respectively. Suppose that the recommendation generating module 350 determines that the future cost value is greater than the future income value from November, 2017, the recommendation generating module 350 may generate a recommendation of discarding the vehicle from November, 2017.

In step 460, the I/O module 310 may transmit the recommendation to the user in response to the request. In some embodiments, the I/O module 310 may transmit the recommendation to the vehicle management platform 110 and/or the vehicle terminal 130.

In some embodiments, the server 120 may perform step 430 and step 440 in any order. For example, the server 120 may perform step 430 before or after step 440. As another example, the server 120 may perform step 430 and step 440 simultaneously.

Figure 5:
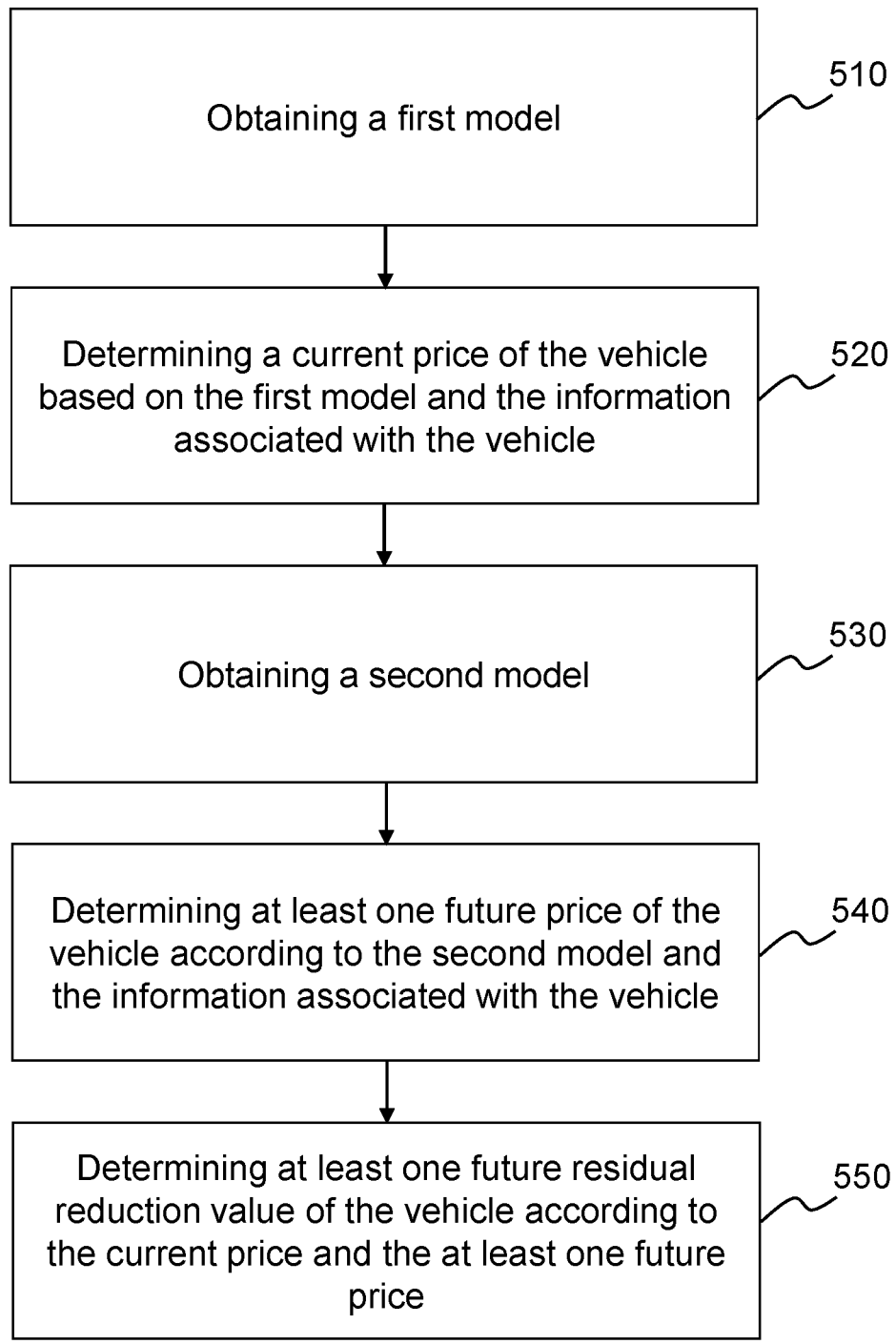
FIG. 5 is a flowchart illustrating an exemplary process of determining a future residual reduction value according to some embodiments of the present disclosure.

FIG. 5 is a flowchart illustrating an exemplary process for determining at least one future residual reduction value of the vehicle according to some embodiments of the present disclosure. In some embodiments, the process 500 may be implemented in the system 100 illustrated in FIG. 1. For example, the process 500 may be stored in the storage 150 and/or the storage device (e.g., the ROM 230, the RAM 240, etc.) as a form of instructions, and invoked and/or executed by the server 120 (e.g., the processor 220 of the server 120, or one or more modules in the server 120 illustrated in FIG. 3). In some embodiments, the process 500 may be used to determine the at least one future cost value in step 440 in the process 400.

In some embodiments, the cost determining module 340 may determine the future residual reduction value based on the price reduction of the vehicle in a future time interval that is within the future time period compared to the price of the vehicle in the current time interval associated with the time when the I/O module 310 receives the request.

In step 510, the cost determining module 340 may determine a first model. In some embodiments, the cost determining module 340 may determine the first model based on a decision tree model. Further, the cost determining module 340 may determine the first model based on a Gradient Boost Decision Tree (GBDT) model. In some embodiments, the cost determining module 340 may determine the first model by training the GBDT model using the vehicle type, at least one prior vehicle age or at least one prior price of the vehicle in at least one prior time interval.

In step 520, the cost determining module 340 may determine a current price of the vehicle based on the first model and the information associated with the vehicle. The current price of the vehicle may refer to the price of the vehicle in a time interval associated with the time when the I/O module 310 receives the request (e.g., a current time interval) or at a time point associated with the time when the I/O module 310 receives the request (e.g., a current time point). In this embodiment, the cost determining module 340 may determine the current price of the vehicle in a current time interval. For example, the I/O module 310 may receive the request on Apr. 10, 2017, and the cost determining module 340 may determine a price of the vehicle in April. In some embodiments, the cost determining module 340 may input the vehicle type and/or the vehicle age in the current time interval to the first model. The first model may generate the current price of the vehicle based on the input. The cost determining module 340 may determine an average selling price in the current time interval or a selling price at a time point in the current time interval as the current price of the vehicle in the current time interval.

In step 530, the cost determining module 340 may determine a second model. In some embodiments, the cost determining module 340 may determine the second model based on a regression model. Further, the cost determining module 340 may determine the second model based on an ARIMA model. In some embodiments, the cost determining module 340 may determine the second model by training the ARIMA model using the vehicle type, at least one prior vehicle age or at least one prior price of the vehicle in at least one prior time interval.

In step 540, the cost determining module 340 may determine at least one future price of the vehicle based on the second model and the information associated with the vehicle. In some embodiments, the cost determining module 340 may input the vehicle type, the vehicle age in the current time interval or one or more future time intervals to the second model. The second model may generate one or more future prices of the vehicle corresponding to the one or more future time intervals in the future time period based on the input. Each future price of the vehicle may correspond to one of the future time interval, respectively. For example, the I/O module 310 may receive the request on Apr. 10, 2017, and the cost determining module 340 may input the vehicle type, the vehicle age in April, 2017, and 12 time intervals from May, 2017 to April, 2018 to the second model. The second model may generate 12 future prices of the vehicle from May, 2017 to April, 2018 based on the input. The cost determining module 340 may determine an average selling price in the future time interval or a selling price at a time point in the future time interval as the future price of the vehicle in the future time interval.

In step 550, the cost determining module 340 may determine at least one future residual reduction value of the vehicle based on the current price of the vehicle and the at least one future price of the vehicle. In some embodiments, the cost determining module 340 may determine the residual reduction value of the vehicle by determining a difference between the current price of the vehicle and the future price of the vehicle. For example, the I/O module 310 may receive the request on Apr. 10, 2017, and the cost determining module 340 may determine a future residual reduction value in May, 2017 by determining a difference between a current price of the vehicle in April, 2017 and a future price of the vehicle in May, 2017.

In some embodiments, the cost determining module 340 may perform step 510 and step 530 in any order. For example, the cost determining module 340 may perform step 510 before or after step 530. As another example, the cost determining module 340 may perform step 510 and step 530 simultaneously.

In some embodiments, the cost determining module 340 may determine the future residual reduction value based on the price reduction of the vehicle at a future time point that is within the future time period compared to the price of the vehicle in the current time point associated with the time when the I/O module 310 receives the request.

The cost determining module 340 may determine a first model. In some embodiments, the cost determining module 340 may determine the first model based on a decision tree model. Further, the cost determining module 340 may determine the first model based on a Gradient Boost Decision Tree (GBDT) model. In some embodiments, the cost determining module 340 may determine the first model by training the GBDT model using the vehicle type, at least one prior vehicle age or at least one prior price of the vehicle at at least one prior time point.

The cost determining module 340 may determine a current price of the vehicle based on the first model and the information associated with the vehicle. In this embodiment, the cost determining module 340 may determine the current price of the vehicle at a current time point. For example, the I/O module 310 may receive the request on Apr. 10, 2017, and the cost determining module 340 may determine a price of the vehicle at a time point on Apr. 10, 2017. In some embodiments, the cost determining module 340 may input the vehicle type and/or the vehicle age to the first model. The first model may generate the current price of the vehicle based on the input.

The cost determining module 340 may determine a second model. In some embodiments, the cost determining module 340 may determine the second model based on a regression model. Further, the cost determining module 340 may determine the second model based on an ARIMA model. In some embodiments, the cost determining module

340 may determine the second model by training the ARIMA model using the vehicle type, at least one prior vehicle age or at least one prior price of the vehicle at at least one prior time point.

The cost determining module 340 may determine at least one future price of the vehicle based on the second model and the information associated with the vehicle. In some embodiments, the cost determining module 340 may input the vehicle type, the vehicle age or one or more future time points to the second model. The second model may generate one or more future prices of the vehicle corresponding to the one or more future time points in the future time period based on the input. Each future price of the vehicle may correspond to one of the future time point, respectively. For example, the I/O module 310 may receive the request on Apr. 10, 2017, and the cost determining module 340 may input the vehicle type, the vehicle age in April, 2017, and 12 time points in a time period from May, 2017 to April, 2018 to the second model. The second model may generate 12 future prices of the vehicle at the 12 time points in the time period from May, 2017 to April, 2018 based on the input.

The cost determining module 340 may determine at least one future residual reduction value of the vehicle based on the current price of the vehicle and the at least one future price of the vehicle. In some embodiments, the cost determining module 340 may determine the residual reduction value of the vehicle by determining a difference between the current price of the vehicle and the future price of the vehicle. For example, the I/O module 310 may receive the request on Apr. 10, 2017, and the cost determining module 340 may determine a future residual reduction value in May, 2017 by determining a difference between a current price of the vehicle at a time point on Apr. 10, 2017 and a future price of the vehicle at a time point in May, 2017.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An electronic system for vehicle management, comprising:
   at least one internet interface of a network system to connect to at least one network of the network system;
   at least one information exchange port of a user system to communicate with a plurality of users in the user system via the at least one network;
   a bus;
   at least one storage medium electronically connected to the bus, comprising a set of instructions; and
   logic circuits configured to communicate with the at least one storage medium via the bus and communicate with the at least one information exchange port of the user system via the at least one network, wherein when executing the set of instructions, the logic circuits are directed to:
      receive, via the at least one information exchange port, first electronic signals from a user of the plurality of users in the user system, the first electronic signals including a request to evaluate a vehicle;
      obtain information associated with the vehicle in a first time period in response to the request;
      determine an income value associated with the vehicle in a second time period based on the information associated with the vehicle;
      determine a cost value associated with the vehicle in the second time period based on the income value and the information associated with the vehicle;
      generate a recommendation as to whether to discard the vehicle based on the income value and the cost value; and
      transmit, via the at least one information exchange port, second electronic signals including the recommendation to the user of the plurality of users in the user system.

2. The electronic system of claim 1, wherein to determine the cost value, the logic circuits are directed to:
   determine a vehicle mileage in the second time period based on the information associated with the vehicle; and
   determine an operation cost associated with the vehicle in the second time period based on the vehicle mileage in the second time period.

3. The electronic system of claim 1, wherein to determine the cost value, the logic circuits are directed to:
   determine a current price of the vehicle in a first time point based on a first model and the information associated with the vehicle, the first time point being prior to the second time period;
   determine one or more prices of the vehicle corresponding to one or more second time points in the second time period based on a second model different from the first model and the information associated with the vehicle; and
   determine a residual reduction value associated with the vehicle in the second time period based on the current price of the vehicle and one of the one or more prices of the vehicle in the second time period.

4. The electronic system of claim 3, wherein the first model is a gradient boosting decision tree regression model, and the second model is an autoregressive integrated moving average model.

5. The electronic system of claim 1, wherein to generate the recommendation as to whether to discard the vehicle based on the income value and the cost value, the logic circuits are further directed to:
   determine whether the cost value is greater than the income value; and
   generate the recommendation to discard the vehicle in response to a determination that the cost value is greater than the income value.

6. The electronic system of claim 1, wherein the first time period is prior to the second time period.

7. The electronic system of claim 1, wherein the information associated with the vehicle in the first time period includes at least one of
   a vehicle type,
   a vehicle age,
   a vehicle mileage,
   an operation cost of the vehicle,
   an operation income of the vehicle, or
   a price of the vehicle.

8. The electronic system of claim 1, wherein the income value includes at least one of
   an operation income associated with the vehicle in the second time period; or
   a risk coefficient.

9. A method for vehicle management implemented on a computing device having one or more processors and one or more storage media, the method comprising:
   receiving, by the one or more processors, first electronic signals from a user via at least one information exchange port of a user system, the first electronic signals including a request to evaluate a vehicle;
   obtaining, by the one or more processors, information associated with a vehicle in a first time period in response to the request;
   determining, by the one or more processors, an income value associated with the vehicle in a second time period based on the information associated with the vehicle;
   determining, by the one or more processors, a cost value associated with the vehicle in the second time period based on the income value and the information associated with the vehicle;
   generating, by the one or more processors, a recommendation as to whether to discard the vehicle based on the income value and the cost value; and
   transmitting, by the one or more processors, second electronic signals including the recommendation to the user via the at least one information exchange port.

10. The method of claim 9, wherein the determining of the cost value comprising:
    determining, by the one or more processors, a vehicle mileage in the second time period based on the information associated with the vehicle; and
    determining, by the one or more processors, an operation cost associated with the vehicle in the second time period based on the vehicle mileage in the second time period.

11. The method of claim 9, wherein the determining of the cost value comprising:
    determining, by the one or more processors, a current price of the vehicle in a first time point based on a first model and the information associated with the vehicle, the first time point being prior to the second time period;
    determining, by the one or more processors, one or more prices of the vehicle corresponding to one or more second time points in the second time period based on a second model different from the first model and the information associated with the vehicle; and determining, by the one or more processors, a residual reduction value associated with the vehicle in the second time period based on the current price of the vehicle and one of the one or more prices of the vehicle in the second time period.

12. The method of claim 11, wherein the first model is a gradient boosting decision tree regression model, and the second model is an autoregressive integrated moving average model.

13. The method of claim 9, wherein the generating of the recommendation as to whether to discard the vehicle based on the income value and the cost value comprises:

determining, by the one or more processors, whether the cost value is greater than the income value; and generating, by the one or more processors, the recommendation to discard the vehicle in response to a determination that the cost value is greater than the income value.

14. The method of claim 9, wherein the first time period is prior to the second time period.

15. The method of claim 9, wherein the information associated with the vehicle in the first time period includes at least one of
a vehicle type,
a vehicle age,
a vehicle mileage,
an operation cost of the vehicle,
an operation income of the vehicle, or
a price of the vehicle.

16. The method of claim 9, wherein the income value includes at least one of
an operation income associated with the vehicle in the second time period; or
a risk coefficient.

17. A non-transitory computer readable medium, comprising at least one set of instructions, wherein when executed by one or more processors of an electronic device, the at least one set of instructions directs the one or more processors to perform acts of:

obtaining information associated with a vehicle in a first time period;

determining an income value associated with the vehicle in a second time period based on the information associated with the vehicle;

determining a cost value associated with the vehicle in the second time period based on the income value and the information associated with the vehicle; and generating a recommendation as to whether to discard the vehicle based on the income value and the cost value.

18. The non-transitory computer readable medium of claim 17, wherein the generating of the recommendation as to whether to discard the vehicle based on the income value and the cost value comprises:

determining whether the cost value is greater than the income value; and generating the recommendation to discard the vehicle in response to a determination that the cost value is greater than the income value.

* * * * *